(12) United States Patent
Forlines et al.

(10) Patent No.: US 7,486,274 B2
(45) Date of Patent: Feb. 3, 2009

(54) METHOD FOR STABILIZING AND PRECISELY LOCATING POINTERS GENERATED BY HANDHELD DIRECT POINTING DEVICES

(75) Inventors: Clifton L. Forlines, Brookline, MA (US); Ravin Balakrishnan, Toronto (CA)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 653 days.

(21) Appl. No.: 11/207,129

(22) Filed: Aug. 18, 2005

(65) Prior Publication Data

US 2007/0040800 A1 Feb. 22, 2007

(51) Int. Cl.
*G06F 3/033* (2006.01)
(52) U.S. Cl. .................. 345/157; 715/856; 715/858
(58) Field of Classification Search .................. 345/157; 178/19.01, 19.05; 715/865, 856–858
See application file for complete search history.

(56) References Cited

U.S. PATENT DOCUMENTS

| 4,764,885 | A * | 8/1988 | Greanias et al. ............. 345/179 |
| 6,175,801 | B1 * | 1/2001 | Millington .................. 701/207 |
| 2002/0056575 | A1 * | 5/2002 | Keely et al. .............. 178/18.01 |
| 2004/0027395 | A1 * | 2/2004 | Lection et al. .............. 345/855 |
| 2005/0104849 | A1 * | 5/2005 | Hoile ......................... 345/157 |
| 2006/0028446 | A1 * | 2/2006 | Liberty et al. ............... 345/158 |
| 2006/0227107 | A1 * | 10/2006 | Ho ............................. 345/158 |

OTHER PUBLICATIONS

Beardsley et al., Interaction Using a Handheld Projector, Jan.-Feb. 2005, IEEE Computer Graphics and Applications, vol. 25, Issue 1, pp. 39-43.*
Accot, J. and Zhai, S. (2002). More than dotting the i's—foundations for crossing-based interfaces. ACM CHI Conference on Human Factors in Computing Systems. p. 73-80.
Apitz, G. and Guimbretière, F. (2004). CrossY: a crossing-based drawing application. ACM UIST Symposium on User Interface Software and Technology. p. 3-12.
Beardsley, P., van Baar, J., Raskar, R., and Forlines, C. (2005). Interaction using a handheld projector. IEEE Computer Graphics and Applications, 25(1). p. 39-43.
Carpendale, M.S.T. and Montagnese, C.A. (2001). A framework for unifying presentation space. ACM UIST Symposium on User Interface Software and Technology. p. 61-70.
Furnas, G. (1986). Generalized fisheye views. ACM CHI Conference on Human Factors in Computing Systems. p. 16-23.

(Continued)

*Primary Examiner*—Amr Awad
*Assistant Examiner*—Liliana Cerullo
(74) *Attorney, Agent, or Firm*—Dirk Brinkman; Gene Vinokur (57) ABSTRACT

The invention provides a method to stabilize a pointer displayed within an output image. The method enables the user to magnify selected areas within the output image. This allows the user to 'zoom' in on areas of interest in the output image, and to make accurate selections with the stabilized pointer. Design features of the method enable pixel and sub-pixel accurate pointing, which is not possible with most conventional direct pointing devices. The invention can be worked for 2D and 3D pointers.

17 Claims, 11 Drawing Sheets

OTHER PUBLICATIONS

Kirstein, C. and Muller, H. (1998). Interaction with a projection screen using a camera tracked laser pointer. Multimedia Modeling Conference, p. 191-192.

Matveyev, S. and Göbel, M. (2003). The Optical Tweezers: multiple-point interaction technique. Virtual Reality Software and Technology. p. 184-188.

Myers, B., Bhatnagar, R., Nichols, J., Peck, C.H., Kong, D., Miller, R., and Long, C. (2002). Interacting at a distance: measuring the performance of laser pointers and other devices. ACM CHI Conference on Human Factors in Computing Systems. p. 33-40.

Oh, J.-Y. and Stuerzlinger, W. (2002). Laser pointers as collaborative pointing devices. Graphics Interface. p. 141-149.

Olsen, D.R. and Nielsen, T. (2001). Laser pointer interaction. ACM CHI Conference on Human Factors in Computing Systems. p. 17-22.

Peck, C. (2001). Useful parameters for the design of laser pointer interaction techniques. Extended Abstracts of the ACM CHI Conference on Human Factors in Computing Systems. p. 461-462.

Raskar, R., van Baar, J., Beardsley, P., Willwacher, T., Rao, S., and Forlines, C. (2003). iLamps: geometrically aware and self-configuring projectors. ACM Transactions on Graphics, 22(3).

Raskar, R., Beardsley, P., van Baar, J., Wang, Y., Dietz, P., Lee, J., Leigh, D., and Willwacher, T. (2004). RFIG lamps: interacting with a self-describing world via photosensing wireless tags and projectors. ACM Transactions on Graphics, 23(3). p. 406-415.

Sarkar, M. and Brown, M. (1992). Graphical fisheye views of graphs. ACM CHI Conference on Human Factors in Computing Systems. p. 83-91.

Symbol Technologies. Laser projection display. www.symbol.com/products/oem/lpd.html.

Ware, C. and Balakrishnan, R. (1994). Reaching for objects in VR displays: Lag and frame rate. ACM Transactions on Computer-Human Interaction, 1(4). p. 331-356.

Ware, C. and Lewis, M. (1995). The DragMag image magnifier. Extended Abstracts of the ACM CHI Conference on Human Factors in Computing Systems. p. 407-408.

* cited by examiner

METHOD FOR STABILIZING AND PRECISELY LOCATING POINTERS GENERATED BY HANDHELD DIRECT POINTING DEVICES

FIELD OF THE INVENTION

This invention relates generally to pointing devices, and more particularly to handheld direct pointing devices.

BACKGROUND OF THE INVENTION

Pointing Devices

Two types of pointing devices are generally used for interactive applications. With indirect pointing devices, e.g., mice, touch pads and joysticks, the movement of the pointer on the display surface does not correspond to the movement of the pointing device. For example, a mouse moves horizontally, while the pointer or cursor on the display screen moves vertically. This causes a perceptual disconnect between the user, the pointing device and the application. With direct pointing devices, e.g., laser pointers and styli, the movement of the pointer, i.e., a red dot, corresponds exactly to the movement of the pointing device in the hand. This greatly enhances the interaction. However, direct pointing devices suffer from jitter and lack of precision.

Projecting Devices

Projectors have traditionally been used as static, output-only devices for presenting content in a non-interactive manner to a relatively passive audience. However, recent advances in projection technology have led to significant decreases in cost, size, and power requirements. This is a trend that is likely to continue.

Users can now consider more interactive and mobile uses for projectors. Consider the possibilities that arise when, for example, the projector is small and light enough to be handheld. In this case, any convenient surface can become a computationally enabled display. Unlike conventional small display screens used with portable computing devices such as mobile telephones and personal digital assistants (PDAs), a projected image is large enough to enable viewing by more than one person.

Raskar et al. describe applications for handheld projectors and a variety of interesting ways in which the projectors can be used in an interactive manner, Raskar et al., "iLamps: Geometrically Aware and Self-Configuring Projectors", ACM Transactions on Graphics (TOG), ISSN: 0730-0301, vol. 22, issue 3, pp. 809-818, July 2003, also in: Mitsubishi Electric Research Laboratory (MERL) Technical Report, TR2003-023; U.S. Pat. No. 6,764,185, issued to Beardsley et al. on Jul. 20, 2004, "Projector as an input and output device"; and Raskar et al., "RFIG lamps: interacting with a self-describing world via photo-sensing wireless tags and projectors", ACM Transactions on Graphics, 23(3), pp. 406-415, 2003.

Of particular interest is their solution to the problems of keystone correction and rotation. By using a camera in conjunction with the handheld projector, they determine a pose of the projector relative to the display surface and use the pose to correct for distortion and rotation, and to factor out projector motion. This enables a dynamically updated output image to be stably displayed at a fixed location and orientation.

Pointing Projectors

By displaying a pointer or cursor at the center of the output image, movement of a projector can directly control the pointer's movement across a stabilized region inscribed within the projector's output image. With direct pointer control and a button on the projector, all standard interactions as in a 'WIMP' interface are possible. This results in an interactive handheld projector that is concurrently an output device and an input device.

Furthermore, because the pointer directly follows hand movement, the interaction is akin to direct pointing, which is arguably more satisfying than other indirect pointing, such as using a mouse, a touch pad, a roller ball or a joystick.

Although appealing in its simplicity and directness, this style of interactive handheld projection has limitations in practice due to the lack of precision of pointer movement, as well as low resolution of the stable image within the output image.

A number of techniques are known for using laser pointers as input devices for large screen interaction, C. Kirstein and H. Muller, "Interaction with a projection screen using a camera tracked laser pointer", Multimedia Modeling Conference., p. 191-192, 1998; S. Matveyev and M. Göbel, "The Optical Tweezers: multiple-point interaction technique", Virtual Reality Software and Technology. p. 184-188, 2003; S. Matveyev, M. Göbel and P. Frolov, "Laser pointer interaction with hand tremor elimination", HCI International, p. 376-740, 2003; B. Myers, R. Bhatnagar, J. Nichols, C. H. Peck, D. Kong, R. Miller and C. Long, "Interacting at a distance: measuring the performance of laser pointers and other devices", ACM CHI Conference on Human Factors in Computing Systems, p. 33-40, 2002; J.-Y. Oh and W. Stuerzlinger, "Laser pointers as collaborative pointing devices", Graphics Interface, p. 141-149, 2002; D. R. Olsen and T. Nielsen "Laser pointer interaction", ACM CHI Conference on Human Factors in Computing Systems, p. 17-22, 2001; and C. Peck, "Useful parameters for the design of laser pointer interaction techniques", Extended Abstracts of the ACM CHI Conference on Human Factors in Computing Systems, p. 461-462, 2001.

Jitter

Laser-pointer interaction is hindered by the same handheld jitter problem faced by interactive handheld projection. Myers et al. compared laser pointers to other devices in pointing tasks and found laser pointers to perform the worst with, at best, a four pixel selection accuracy even after predictive filtering. Oh et al. designed a computer-controlled laser pointer with Kalman filtering. However, they still had error rates of around 40% when selecting relatively large 40-pixel diameter targets. Matveyev et al. describe a more elaborate model for reducing the effects of jitter but do not provide user data measuring the performance of their approach. Peck describes significant handheld jitter effects for laser-pointer tracking deviations. The Olsen et al. laser-pointer interaction technique is optimized to avoid handheld jitter as much as possible.

The prior art seems to indicate that the effects of hand-jitter are not easily solved by data-filtering techniques.

Delay

More importantly, techniques that use data-filtering, even if they do work, introduce a significant delay. Delay hinders user interaction. That is, the physical cues are not concurrent with the visual cues. This is detrimental to performance, see C. Ware and R. Balakrishnan, "Reaching for objects in VR displays: Lag and frame rate", ACM Transactions on Computer-Human Interaction, 1(4), pp. 331-356, 1994.

Standard delay-inducing, pointing-enhancing techniques, such as using non-linear transfer functions that change pointer-movement characteristics based on the velocity of the user input, work reasonably well for indirect input devices, such as a mouse, a touchpad, or a joystick.

However, those techniques are not easily applicable to direct pointing devices, such as interactive handheld projectors, styli and laser pointers, where there is a direct one-to-one correspondence between device movement and pointer control. Using non-linear transfer functions in those scenarios introduce a dynamically changing offset between device and pointer positions, resulting in a loss of the very directness that makes such pointing techniques so attractive in the first place. Furthermore, if the offset becomes too large, the pointer can end up outside the tracking envelope.

Pointer prediction techniques have been successfully used to stabilize indirect pointing, J. Baldwin, A. Basu and H. Zhang, "Predictive windows for delay compensation in telepresence applications", IEEE International Conference on Robotics & Automation, pp. 2884-2889, 1998 and A. Murata, "Improvement of pointing time by predicting targets with a PC mouse", International Journal of Human Computer Interaction, 10(1), pp. 23-32, 1998. However, those techniques are difficult to apply to direct absolute pointing due to the resulting disconnect that arises between actual and predicted pointer positions when delays occur.

Precision

Zooming and magnification techniques have been used to explore areas of interest in an image, see G. Furnas, "Generalized fisheye views", ACM CHI Conference on Human Factors in Computing Systems. pp. 16-23, 1986 and M. Sarkar and M. Brown, "Graphical fisheye views of graphs", ACM CHI Conference on Human Factors in Computing Systems, pp. 83-91, 1992.

A variety of focus-in-context techniques are also known, M. S. T. Carpendale and C. A. Montagnese, "A framework for unifying presentation space", ACM UIST Symposium on User Interface Software and Technology, pp. 61-70, 2001; S. Carpendale, "A framework for elastic presentation space", Department of Computer Science, Simon Fraser University, 1999; J. Mackinlay, G. Robertson and S. Card, "The perspective wall: Detail and context smoothly integrated", ACM CHI Conference on Human Factors in Computing Systems, pp. 56-63, 1991 and C. Ware and M. Lewis, "The DragMag image magnifier", Extended Abstracts of the ACM CHI Conference on Human Factors in Computing Systems, pp. 407-408, 1995.

Another technique uses tracking menus, G. Fitzmaurice, A. Khan, R. Pieke, B. Buxton and G. Kurtenbach, "Tracking menus", ACM UIST Symposium on User Interface Software and Technology, pp. 71-79, 2003. There a pointer moves freely within a predefined region, but drags the region along in the direction of pointer movement when the pointer moves beyond the edge of the region.

It is desired to solve the jitter and precision problems for handheld pointers.

SUMMARY OF THE INVENTION

It is an object of the invention to solve several problems that exist with interactive handheld pointing devices. One problem is due to jitter when an image and a pointer are displayed by a direct pointing device, such as a handheld projector, a laser pointer or a stylus. This makes it difficult to see the details of the image, as well as to provide accurate input. Another problem is a reduced image resolution due to image stabilization and image warping processes.

Therefore, the invention provides a method to stabilize a pointer displayed within an output image. The method also enables the user to magnify selected areas within the output image. This allows the user to 'zoom' in on areas of interest in the output image, and to make accurate selections with the stabilized pointer.

Design features of the method enable pixel and sub-pixel accurate pointing, which is not possible with most conventional direct pointing devices.

The invention can be worked for 2D and 3D pointers.

DETAILED DESCRIPTION OF THE PREFERRED EMBODIMENT

Pointer Terminology

A physical pointer is visible indicia on a display surface that is due to light directly projected by a direct pointing device at a display surface. Therefore, a physical location of the physical pointer corresponds directly to a pose of the direct pointing device. For example, a laser pointer always displays a red dot as a physical pointer at the spot where it is aimed. Similarly, a stylus inputs at the point of contact.

A virtual pointer is visible indicia on a display surface that is due to light indirectly projected onto a display surface by a direct pointing device. A virtual pointer may or may not correspond to the pose of the pointing device. A virtual pointer is a set of pixels in an output image generated by a projector.

A physical location of a pointer on a display surface corresponds exactly to the pose of the pointing device. A virtual pointer may be displayed at the physical location. However, this is not a requirement. A physical pointer is always displayed at the physical location.

A virtual location of a pointer on a display surface can be determined from the physical location. The virtual location can also consider other factors, such as jitter, speed and acceleration of a direct pointing device, and application constraints.

For an indirect pointing device such as a mouse, touchpad or joystick, the pose of the device and movement of the device is only indirectly related to the location of the pointer on the display surface. For example, a mouse typically moves in a horizontal plane, while the pointer moves in a vertical plane.

Direct Pointing Device

Figure 1:
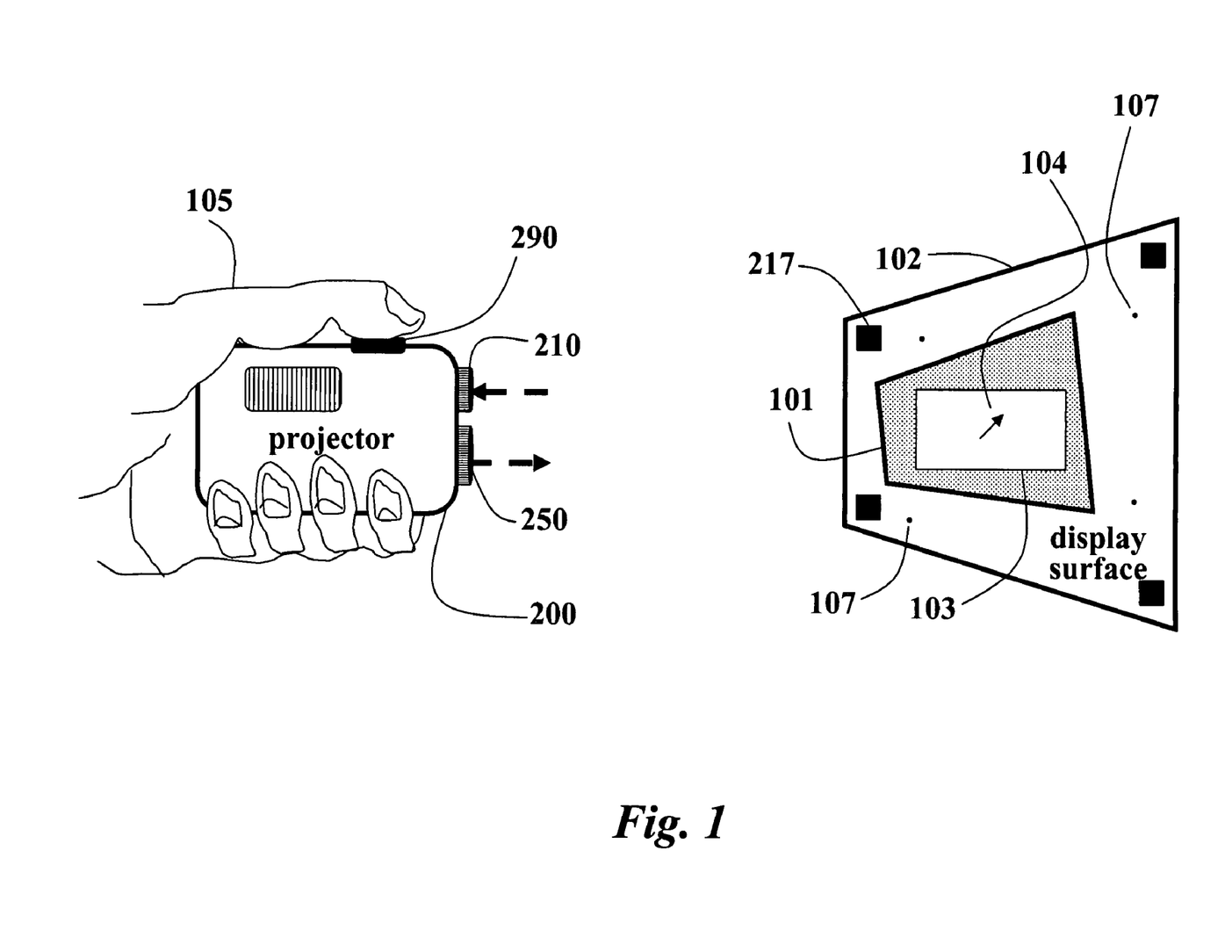
FIG. 1 is a diagram of a handheld direct pointing projector according to an embodiment of the invention.

FIG. 1 shows a handheld direct pointing device 200 according one embodiment of the invention. The invention includes a projector subsystem 250, a pose subsystem 210, and user controls 290. The pointing device can display an uncorrected output image 101 on a display surface 102. The output image 101 includes a corrected and stabilized region 103. A virtual pointer 104 can be displayed within the stabilized region. The virtual pointer 104 substantially follows the movement of the pointing device 200. The movement can be controlled by a hand 105 or some other mechanical projector platform.

Figure 2:
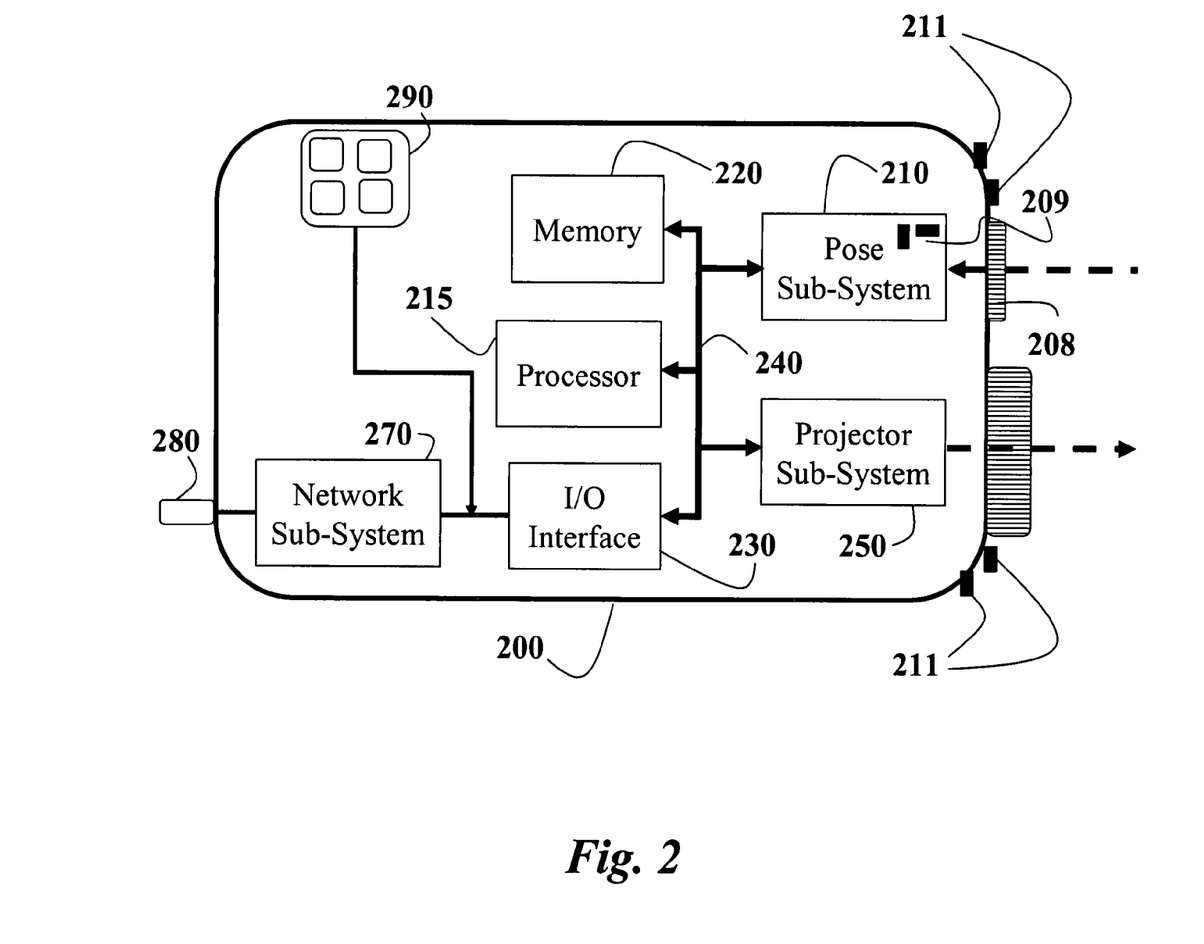
FIG. 2 is a block diagram of the pointing projector of FIG. 1.

FIG. 2 shows details of the direct pointing device 200, including the pose subsystem 210, the projector subsystem 250, a microprocessor 215, a memory 220, and an I/O interface 230 connected by buses 240, generally referred to as a processing unit. Further details are described in U.S. Pat. No. 6,764,185 incorporated herein by reference.

The processing unit is conventional in its electronic structure, but unconventional in its operation when performing the method steps described herein. A network sub-system 270 allows the projector to communicate with other similar devices, or other computing devices and memories, local or remote. Therefore, the network system can be connected to an antenna or infrared transceiver 280, depending on the communications medium. The network connection can also be wired. The controls 290 can be used to provide input.

The pose subsystem 210 determines the pose of the projector with respect to the display surface 102, for further details, see U.S. Pat. No. 6,811,264 issued to Raskar et al. on Nov. 2, 2004, "Geometrically Aware Projector" incorporated herein by reference. Pose means the 3D location and 3D orientation.

The pose subsystem can include a camera subsystem 208, motion detectors, accelerometers, tilt sensors, and the like 209.

The pointing device can also be equipped with four laser pointers 211. The laser pointers project physical pointers in the form of laser dots 107 at actual locations on the display surface. The camera subsystem 208 can observe the physical locations of dots 107 to determine the pose of the pointing device.

Alternatively, the display surface 102 can be instrumented as described in U.S. Patent Application Publication No. 2005/0030486 filed by Lee et al. on Feb. 10, 2005, "Method and system for calibrating projectors to arbitrarily shaped surfaces with discrete optical sensors mounted at the surfaces" incorporated herein by reference.

In another method, the display surface includes visual location markers 217. Any of the above methods can be used to determine the 3D pose, i.e., 3D position and 3D orientation, of the pointing device with respect to the display surface. From the pose, the method can correct for rotation, movement, and distortion in order to generate the stable region 103.

Pointer-based interaction is achieved by projecting the virtual pointer 104 at a center of the uncorrected output image 101. The end effect is a stable region within the output image, and a pointer moving according to the motion of the hand 105.

Pointer Jitter

Although the pose information, as described above, enables the generation of a stable region 103 within the jittery output image 101, the pointer which is mapped to the center of the output image remains susceptible to hand jitter. This makes precise pointing difficult. This problem is inherent with all direct freehand pointing devices, whether they project a physical or virtual pointer.

This problem is corrected without the delays inherent in prior art systems with a pointer stabilization method.

Pixel Wastage

The above described technique to display a stable region within an output image wastes some pixels of the uncorrected output image. All of the pixels outside the stable region 103, shown stippled in FIG. 1, are essentially wasted. This is due to the fact that a rectangular display region needs to be inscribed within a possibly distorted output image, see U.S. Pat. No. 6,729,733 issued to Raskar et al. on May 4, 2004, "Method for determining a largest inscribed rectangular image within a union of projected quadrilateral images", incorporated herein by reference.

In addition, pixels are wasted to accommodate movement of the virtual pointer 104. For example, in order for the virtual pointer that is displayed at the center of the output image 101 to be able to traverse the full extent of the stable region 103 in a most direct one-to-one mapping, the stable region 103 must have less than about ¼ of the number of pixels in the output image 101. Because the stable region has fewer pixels, the stable region has a lower resolution, making it more difficult to see details and to position the pointer accurately.

This problem is corrected with an image magnification method.

Zoom-and-Pick

In an effort to alleviate both jitter and resolution limitations of interactive handheld projectors, the invention provides a method that eliminates jitter of a pointer without introducing delay, and selectively magnifies portions of an output. The method enables the user to magnify an area of interest in the displayed image, and then point at pixels within the area of interest with high-precision and without jitter.

Although the method is described with reference to an interactive handheld projector, it should be understood that the method can also be applied to direct laser projectors and conventional static projectors used with a separate pointing devices.

Magnification

Figure 3A:
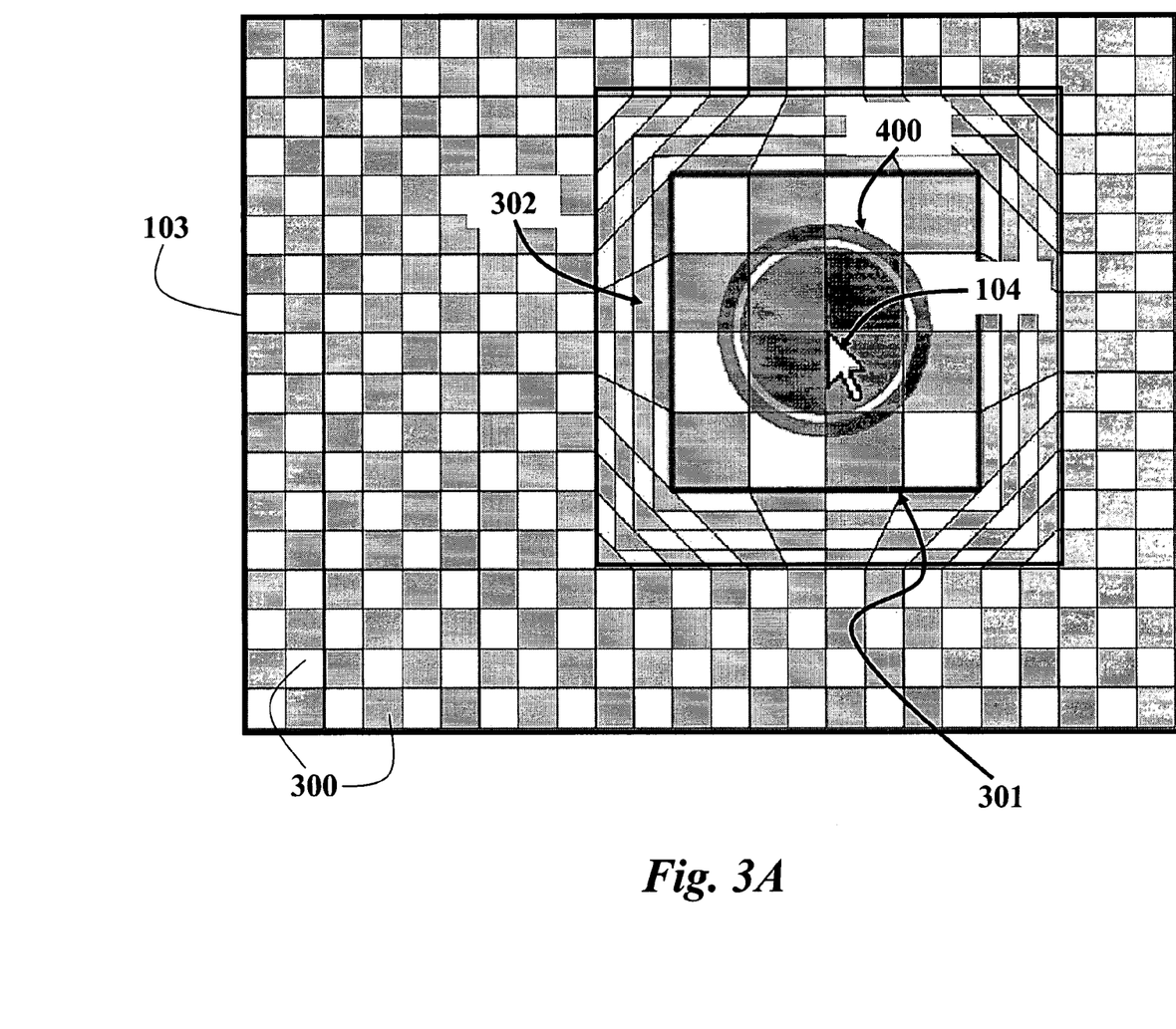
FIG. 3A is a partially magnified output image according to an embodiment of the invention.

FIG. 3A shows schematically pixels 300 of the stable region 103 as a checker board pattern. The schematic also shows a pointer stabilizer 400 described in greater detail below. The method uniformly magnifies a first portion 301 of the stable image 103 centered on the virtual pointer 104. A second portion 302 is progressively magnified. The purpose of the second portion is to provide visual continuity and context between the first magnified portion and the remaining unmagnified portions of the output image.

The level of magnification is adjustable using a 'zoom' function described below. The magnified portions 301-302 follow the virtual pointer 104 as the pointer moves. This enables a display at a higher resolution near the pointer for precise selection.

Figure 3B:
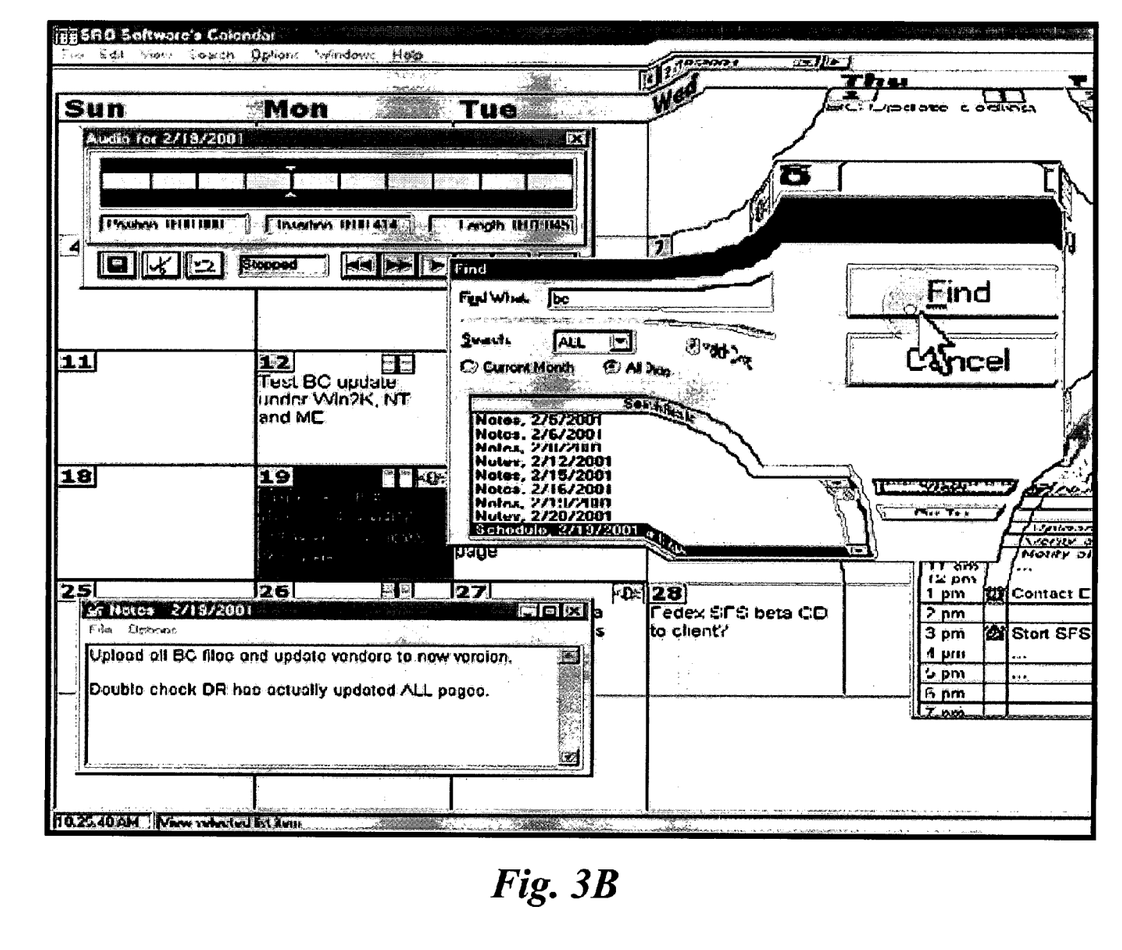
FIG. 3B is a partially magnified application image according to an embodiment of the invention.

FIG. 3B shows a partially magnified output image of an example application.

Figure 4:
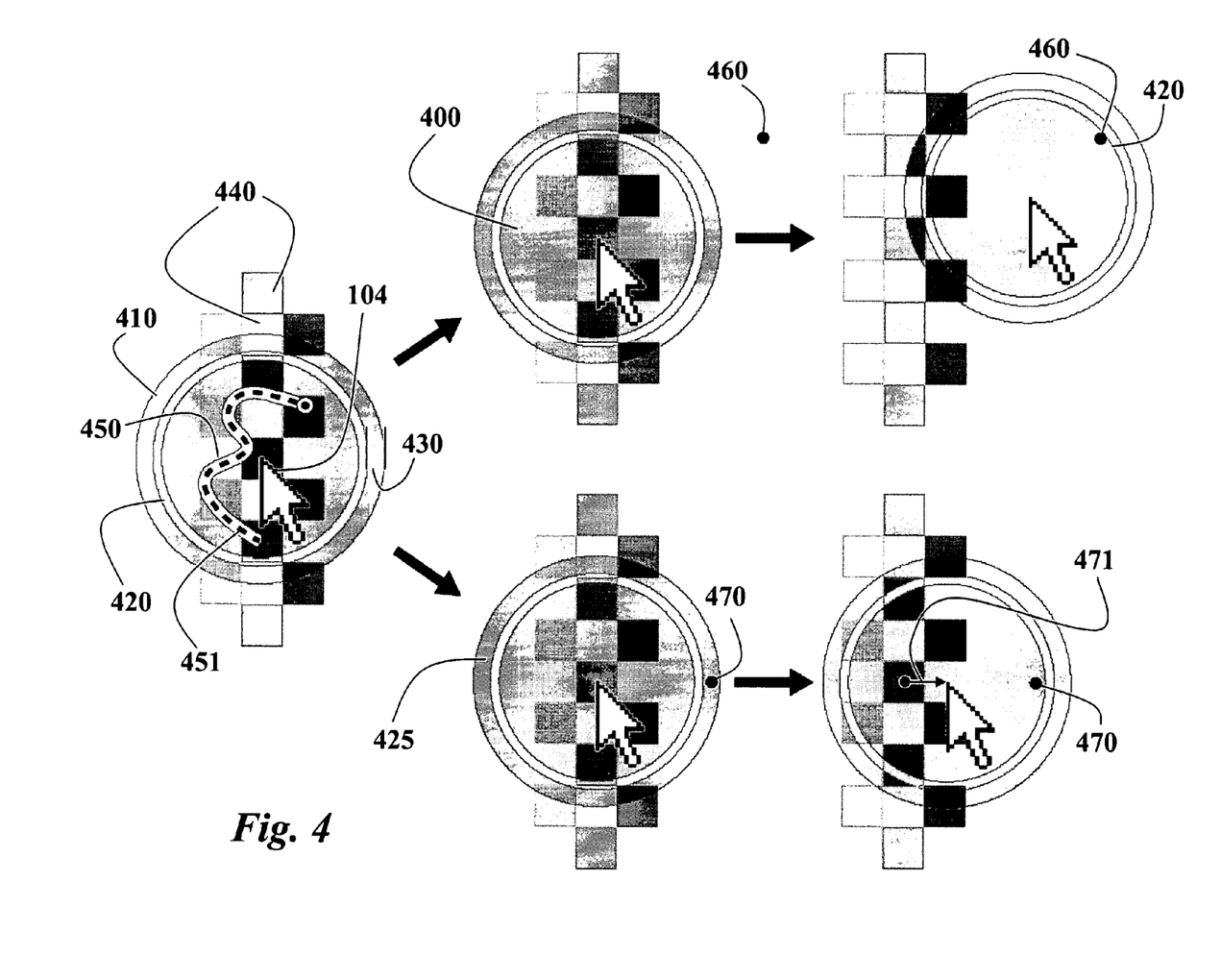
FIG. 4 is a diagram of movement of a pointer stabilizer according to an embodiment of the invention.

As shown in FIG. 4, the pointer stabilizer 400 is defined to include an outer boundary 410 and an inner boundary 420. The area between the inner and outer boundaries is denoted as the rim 425 of the pointer stabilizer.

The black and white 'checkerboard' squares 440 represent pixels. The span of the inner portion of the pointer stabilizer is about five pixels or less. This corresponds to the typical amount of pointer travel due to unavoidable jitter.

A distance 430 between the outer and inner boundaries is based on a sampling rate of the pointer. If the sampling rate is high, the distance can be small, and if the sampling rate is low, then the distance is made large. It should be noted that the sizes for the pointer stabilizer can be adapted to particular applications.

It should be noted that the pointer stabilizer does not need to be displayed. That is, the pointer stabilizer exists as a defined region with special properties.

Pointer Stabilizer

The pointer stabilizer 400 is centered at the virtual pointer 104. A path 450 indicates the jittery movement of pointer, if the pointer is not stabilized as described herein. The black dots 451 on the path would indicate successive instantaneous actual physical locations of the pointer due to jitter. However, the virtual pointer 104 is displayed at the center of the pointer stabilizer 400 at a static virtual location as long as the path remains within the inner boundary 420. This eliminates undesired short distance jitter. That is, if the movement of the physical pointer, as reflected by the pose of the pointing device, is less than a first threshold, i.e., the distance to the first boundary, the virtual pointer 104 is not moved, and the virtual location of the pointer is at the center of the pointer stabilizer.

However, if the user rapidly moves the projector past the inner and outer boundaries so that the pointer would be at physical location 460, then the pointer stabilizer is moved, in a direction of the movement, so that the inner boundary touches the physical location 460, and the position of the virtual pointer 104 is adjusted accordingly to the center of the pointer stabilizer at its new location. This eliminates the effect of long distance jitter.

If the user slowly moves the pointer so that the pointer would be at some location 470 on the rim 425 between the outer and inner boundaries, then the pointer stabilizer is moved 471 a move amount in the direction of the pointing device. Typically, the move amount is equal to a very small number of pixels, or the amount is some fraction of a pixel. For example, the move amount is about five pixels or less. This enables pixel accuracy for a handheld pointer. This is difficult to achieve even with an indirect pointing device, such as a mouse. This movement could be less to enable sub-pixel accuracy when positioning the pointer.

In an actual implementation, the pointer stabilizer does not need to be displayed to the user and, surprisingly, the user still has a better interaction with the displayed image using the handheld projector.

It should be noted that the distance between the inner and outer boundary of the pointer stabilizer is preferably greater than one pixel. Best results are had if the distance is proportional to the amount of magnification and the sampling rate of the pointer.

The method works because the pointer movement, i.e., motion of the handheld projector, is sampled in a discrete manner. The pointer can only be moved beyond the outer boundary of the pointer stabilizer when the pointing device is moved faster than the sampling rate.

Therefore, the method provides magnification, as well as fine and coarse pointer positioning without delay.

Zoom

Figure 5A:
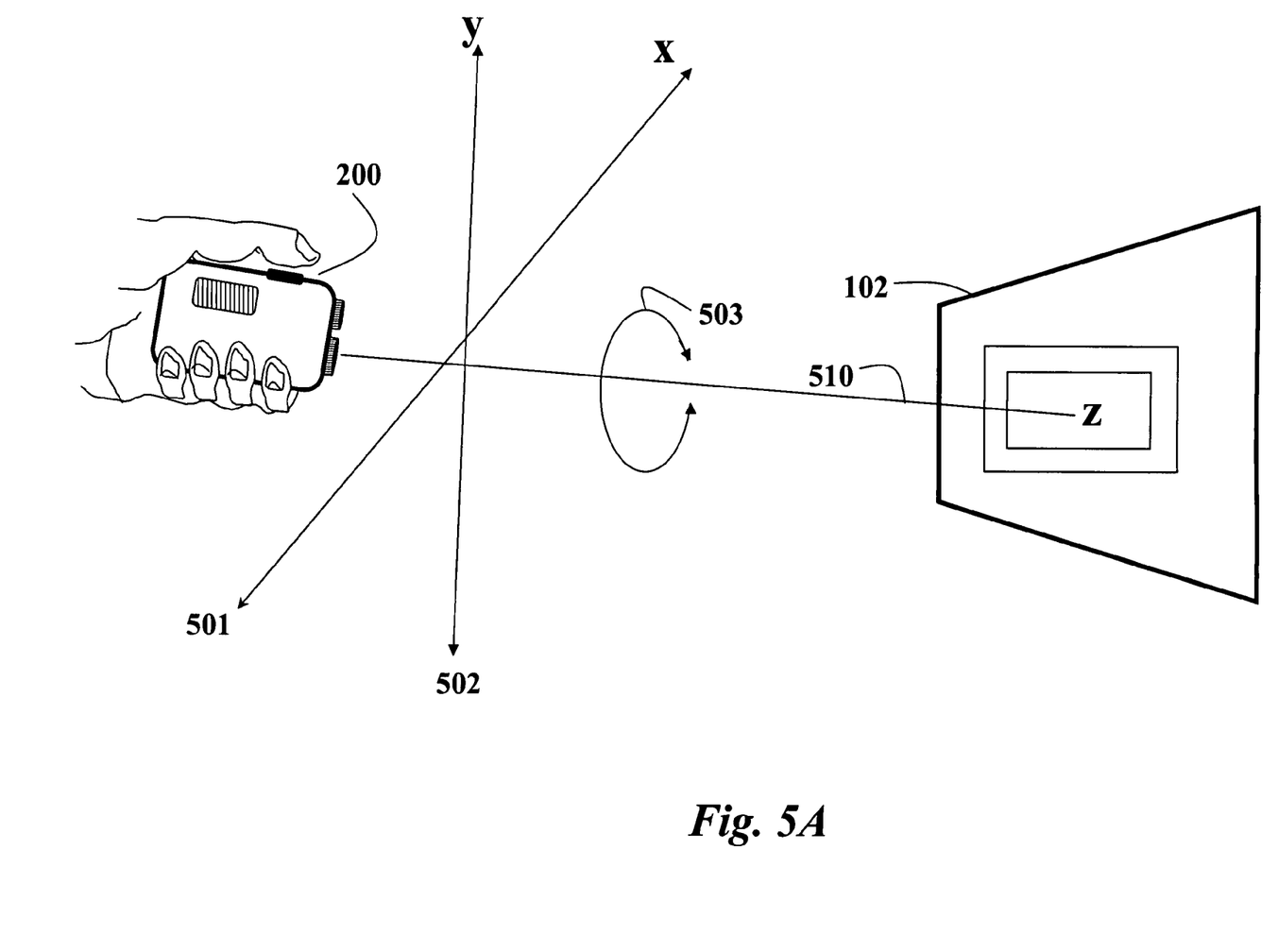
FIG. 5A is a block diagram of a rotatable pointer projector according to an embodiment of the invention.

As shown in FIG. 5A, movement of the pointer in the x direction 501 can be achieved by moving the projector left and right or by yawing. Moving the projector up and down or pitching moves the pointer along the y direction 502. Rotating 503 (roll) the projector about the optical or z axis 510 controls the magnification or zoom. The optical axis is assumed to be substantially normal to the plane of the display surface 102. With conventional projectors, zoom is controlled by only rotating the lens. In contrast, the pointing device according to an embodiment of the invention controls zoom or magnification by rotating the entire device. The rotation can be determined from the pose of the projector. Clockwise rotation can increase magnification, and counter-clockwise rotation can decrease the magnification, or the inverse. Thus, to the user, the rotational magnifying or zoom effect appears natural.

Figure 5B:
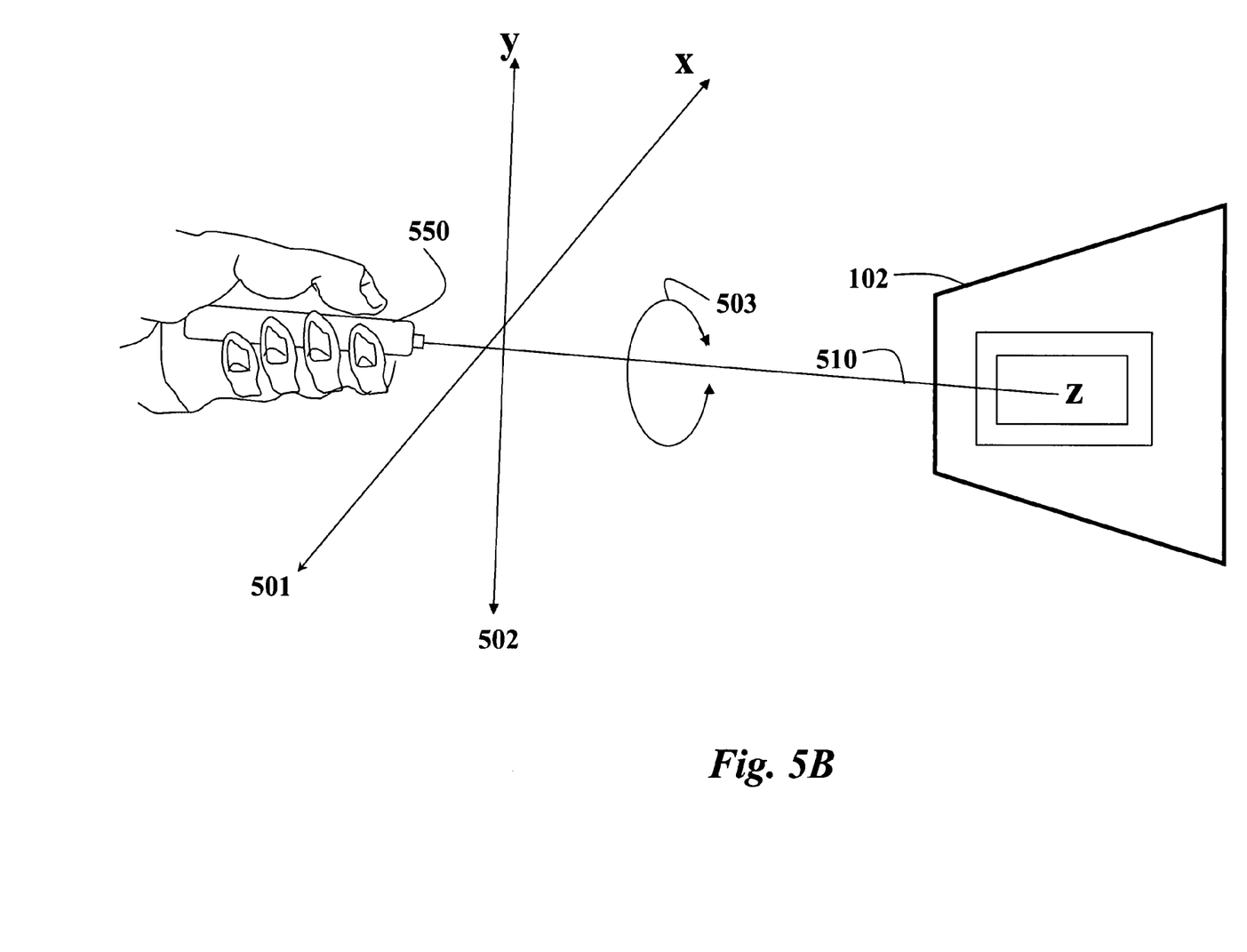
FIG. 5B is a block diagram of a rotatable pointer according to an embodiment of the invention.

As shown in FIG. 5B, this technique can also be used for devices that do not include zoom capabilities otherwise. For example, a laser pointer 550 can be given the zoom effect, by rotating the entire laser as described herein.

Figure 5C:
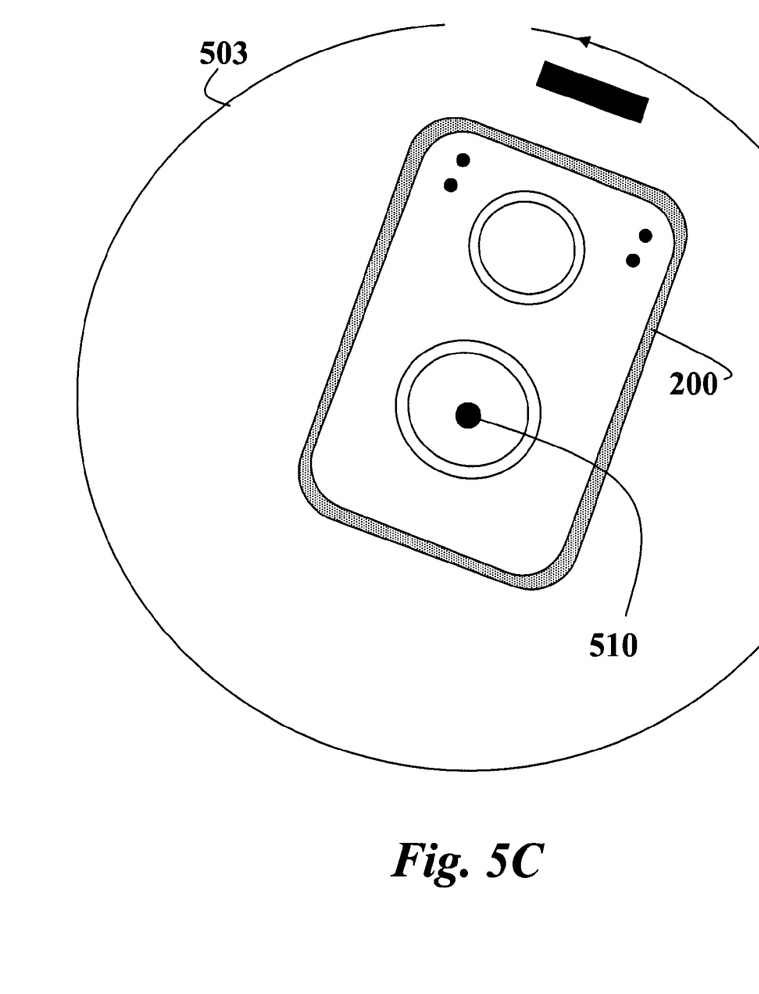
FIG. 5C is a front view of a rotatable pointing projector according to an embodiment of the invention.

FIG. 5C is a front view of a rotated pointing device.

The magnification effect can be further facilitated according to the amount of angular rotation. If the pointing device (projector) is held in its normal orientation, i.e., zero degrees, the magnification is absent. Rotating from 0° to 50° also has no effect on magnification. The full range of magnification is effected from 5° to about 45°. It should be noted that the wrist can comfortably rotate through about 180°. At the maximum rotation, the magnification is a gain factor of about 25×. Thus, the gain on the rotation does not require the user to hold the pointing device in an awkward position. This is in contrast, with conventional zoom lenses, which might need to be turned several full circles to get the full 'zoom' effect.

This makes it convenient for the user to quickly zoom in on some detail to make a selection with the pointer, and then return the pointing projector to its normal orientation to resume normal operation.

In an alternative embodiment, the rotational angles can be partitioned into multiple zones to give the zooming fine and coarse granularities, as well as perhaps infinite zooming capabilities, perhaps even increasing and decreasing the size of the displayed image well beyond its normal form factor. The rate of rotation can also be used to control the amount of zooming.

In another embodiment, 'ratchet' zooming is used. For example, the pointing device is slowly rotated clockwise, and then rapidly reversed for a small angel in a counterclockwise opposite direction, followed by a slow clockwise rotation to effectively successively increase or 'crank-up' the zooming factor.

Figure 6:
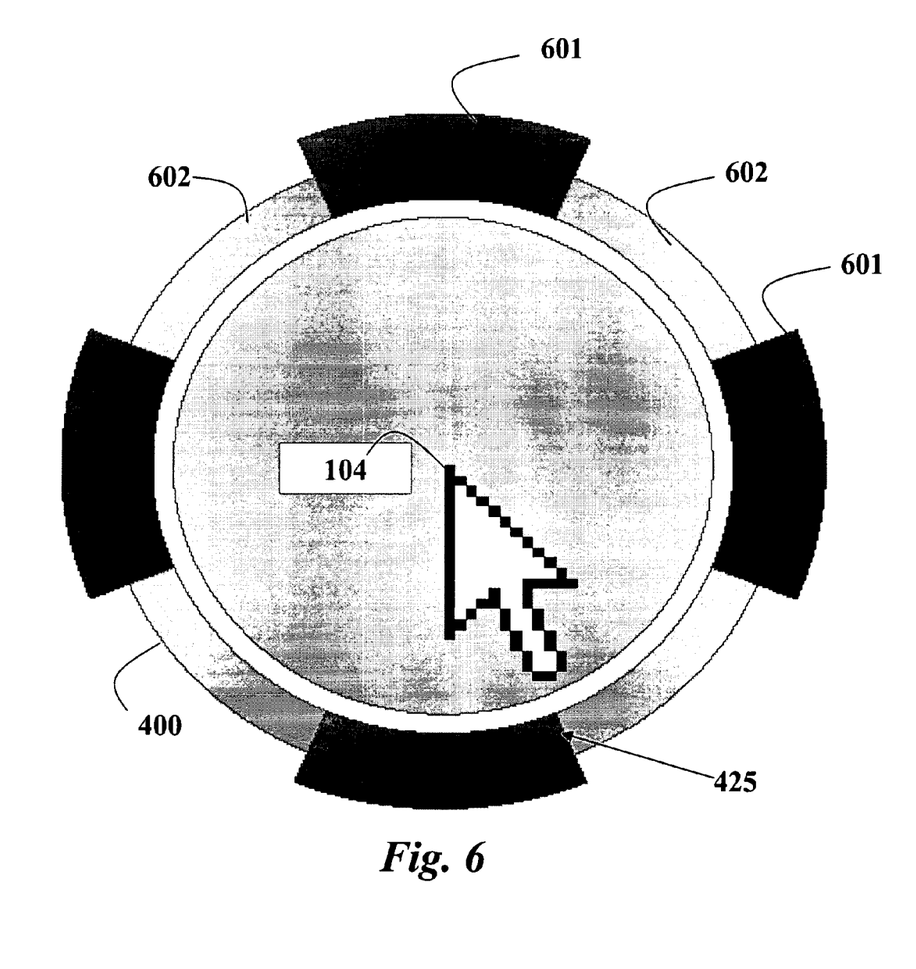
FIGS. 6 and 7 are diagrams of segmented pointer stabilizers according to embodiments of the invention.

As shown in FIG. 6, the effect of the pointer stabilizer region can be refined. In alternative embodiment, the rim 425 between the first and second boundaries is partitioned into sectors 601-602 having different widths. When the pointer is moved into the thick sector 601, the pointer stabilizing region is moved the distance corresponding to one pixel. When the pointer is moved in the wide sector 602, the pointer stabilizer region is 'dragged'.

Figure 7:
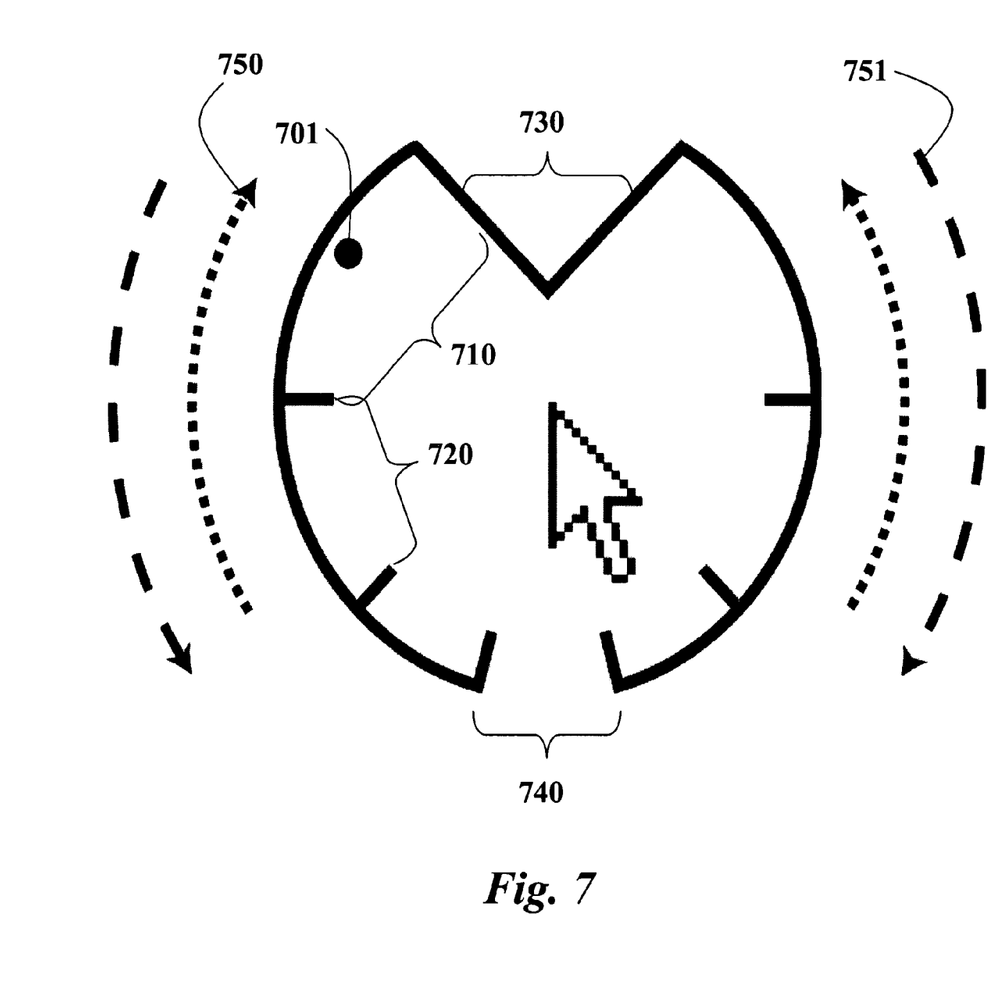

FIG. 7 shows an alternative embodiment. As before, the rim is partitioned into multiple sectors, e.g., sectors 710-720. Each sector has a different effect on the pointer. When the actual pointer 701 is moved in sector 710, rotation is mapped to linear position control of magnification level. In sector 720, rate of increase of magnification is controlled. The cut-out sector 730 indicates a 'dead-zone', where rotation has no effect. Thus, no magnification is effected as long as the pointing device is held in a substantial vertical orientation. Sector 740 at the extreme range of rotation also has no effect.

If ratchet magnification is implemented, then moving in the direction of the dotted lines 750 zooms, and moving backwards in the direction of the dashed line 751 ratchets.

Stabilization Method

Figure 8:
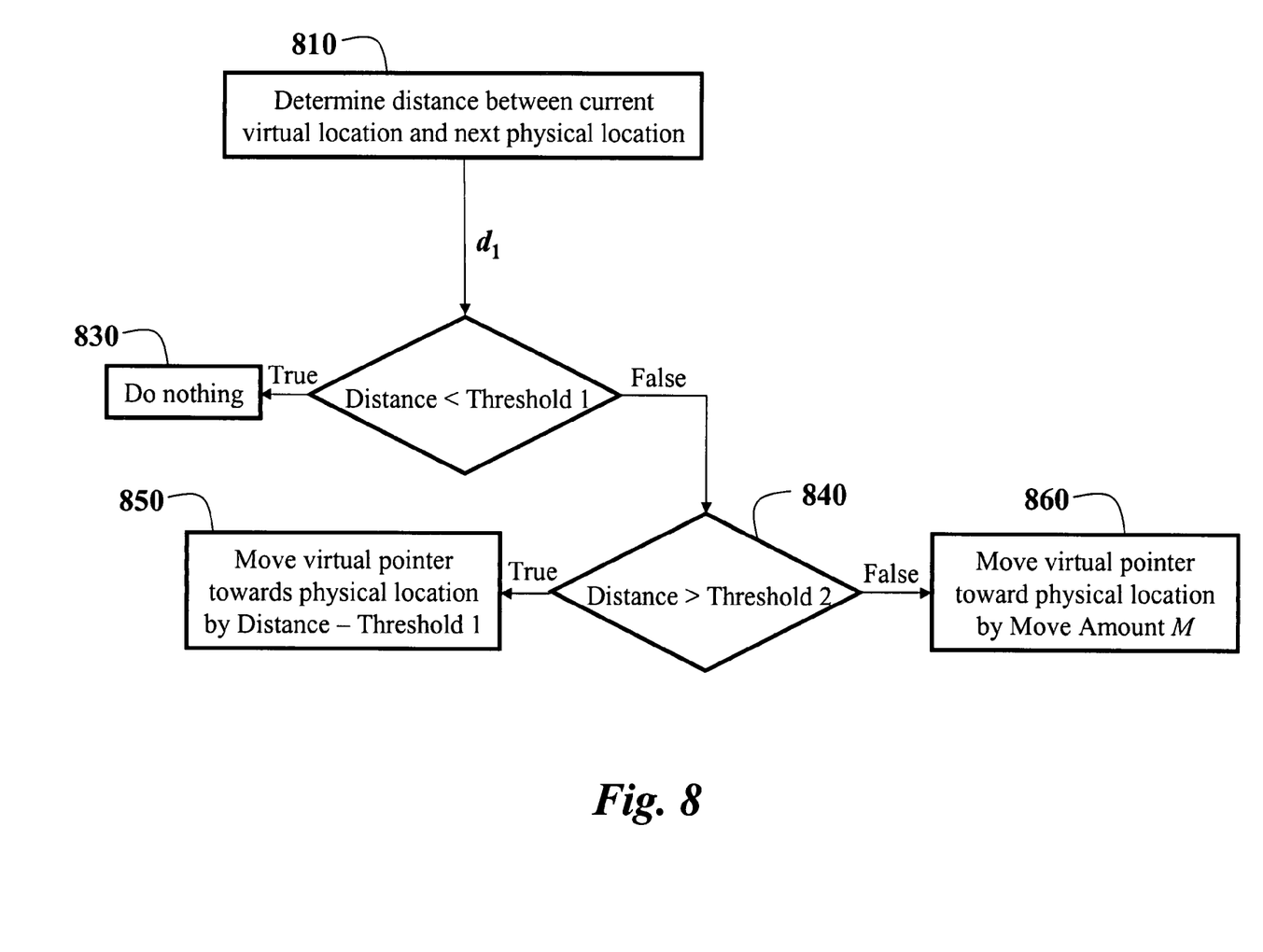
FIG. 8 is a flow diagram of a method according to an embodiment of the invention.

FIG. 8 shows the steps of a stabilization method according to embodiment of the invention. First, determine 810 a distance $d_1$ between a current virtual location of the virtual pointer 104 and a next physical location as determined by the pose subsystem 210. The virtual pointer is displayed at the center of the pointer stabilizer 400. Next, determine whether the distance $d_1$ is less than a first threshold $T_1$, which is equivalent to a radial distance to the inner boundary 420. If true, then do nothing 830. That is, the virtual pointer 104 remains stabilized in place, and it is presumed that the movement of the direct pointing device is due to jitter.

Otherwise, if false, determine 840 if the distance $d_1$ is greater than a second threshold $T_2$, which is equivalent to the radial distance to the outer boundary 410. If true, then move 850 the virtual pointer towards the physical location by an amount $(d_1-T_1)$. That is, the virtual pointer is moved to a new virtual location, and the pointer stabilizer is recentered at that location.

Otherwise, if false, then move 860 the virtual pointer towards the physical location by a move amount M. The move amount M is equal to a desired precision, e.g., one pixel, two pixels, or a fraction of a pixel. In this case, the pointer has been moved into the rim area 425, and precision movement is desired. This means that the second threshold is greater than the first threshold by at least the amount M, i.e., $T_2-T_1>M$.

In one embodiment of the invention, the stabilization method described above is extended for use with input devices that provide three dimensional positional input. Such a 3D input device can be used with a 3D display, e.g., the display surface is curved, or a dome. Alternatively, the display surface is still two-dimensional, but images displayed on the surface appear to be three-dimensional, as in a virtual reality display. That is, the images obey perspective rules. Thus, the user can position the pointer in depth by moving the pointing device towards and away from the display surface.

In this embodiment, the pointing device controls the position of a 3D pointer on the display surface, and the pointer stabilizer is in the form two concentric spheres, an inner sphere and an outer sphere.

In this variation, we first determine a distance $d_1$ between a next 3D physical location provided by the 3D input device and a current virtual 3D location of the 3D pointer at the center of a 3D pointer stabilizer. Next, we determine if this distance $d_1$ is less than a first threshold $T_1$, which is equivalent to the radial distance of the inner sphere. If true, then do nothing. That is, the virtual 3D pointer remains stabilized in place and it is presumed that the movement is due to jitter.

Otherwise, if false, determine if the distance $d_1$ is greater than a second threshold $T_2$, which is equivalent to the radial distance to the outer sphere. If true, then move the virtual pointer toward the physical location by an amount $(d_1-T_1)$. That is, the virtual 3D pointer is moved to a new location and the pointer stabilizer is recentered at that 3D location.

Otherwise, if false, then move the virtual pointer towards the physical location by a move amount M. The move amount M is equal to a desired precision, e.g., one pixel, two pixels, or a fraction of a pixel. In this case, the pointer has been moved into the rim area, and precision movement is desired.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for controlling a location of a pointer displayed by a pointing device on a display surface, comprising:
    determining a current virtual location of a virtual pointer displayed on a display surface by a pointing device;
    determining a next physical location of the virtual pointer according to a pose of the pointing device;
    determining a distance between the current virtual location and the next physical location;
    comparing the distance to a plurality of predetermined thresholds;
    leaving the virtual pointer at the current virtual location if the distance is less than a first threshold, where the first threshold is greater than zero;
    moving the virtual pointer toward the next physical location by an amount equal to the distance minus the first threshold if the distance is greater than a second threshold, in which the second threshold is greater than the first threshold; and otherwise
    moving the virtual pointer toward the next physical location by a move amount.

2. The method of claim 1, in which the move amount is less than five pixels.

3. The method of claim 1, in which the move amount is less then one pixel.

4. The method of claim 1, in which the pointing device includes a projector subsystem configured to display the virtual pointer.

5. The method of claim 4, in which the pointing device includes a pose subsystem for determining the pose.

6. The method of claim 1, in which the pointing device is a direct pointing device.

7. The method of claim 1, in which the pointing device includes a projector subsystem configured to display an uncorrected output image on the display surfaces, and the output image includes a stabilized region, and the virtual pointer is displayed in the stabilized region.

8. The method of claim 7, in which the virtual pointer substantially follows movement of the pointing device.

9. The method of claim 1, further comprising:
    displaying as output image on the display surface; and
    magnifying a selected region of the output image.

10. The method of claim 9, in which the selected region is centered on the virtual pointer as the virtual pointer moves.

11. The method of claim 1, further comprising:
    displaying a pointer stabilizer centered at the virtual pointer.

12. The method of claim 9, in which an amount of magnification is controlled by rotating the pointing device about an optical axis of the pointing device.

13. The method of claim 12, in which clockwise rotation increases the magnification, and counter-clockwise rotation decreases the magnification.

14. The method of claim 9, in which an amount of magnification is multiplied by a gain factor.

15. The method of claim 1, in which the pointing device is a laser pointer.

16. The method of claim 1, in which the pointing device is a stylus.

17. The method of claim 1, in which the physical location is a three-dimensional location and the virtual pointer is a three-dimensional virtual pointer.

* * * * *